(12) United States Patent
Granig et al.

(10) Patent No.: US 11,573,105 B2
(45) Date of Patent: *Feb. 7, 2023

(54) SENSOR SYSTEM USING SAFETY MECHANISM

(71) Applicant: Infineon Technologies AG, Neubiberg (DE)

(72) Inventors: Wolfgang Granig, Seeboden (AT); Dirk Hammerschmidt, Finkenstein (AT)

(73) Assignee: Infineon Technologies AG, Neubiberg (DE)

(*) Notice: Subject to any disclaimer, the term of this patent is extended or adjusted under 35 U.S.C. 154(b) by 34 days.

This patent is subject to a terminal disclaimer.

(21) Appl. No.: 17/163,820

(22) Filed: Feb. 1, 2021

(65) Prior Publication Data

US 2021/0148738 A1 May 20, 2021

Related U.S. Application Data

(63) Continuation of application No. 14/494,055, filed on Sep. 23, 2014, now Pat. No. 10,942,046.

(51) Int. Cl.
*G01D 18/00* (2006.01)
*G01D 3/08* (2006.01)
*H04Q 9/00* (2006.01)

(52) U.S. Cl.
CPC .............. *G01D 18/00* (2013.01); *G01D 3/08* (2013.01); *H04Q 9/00* (2013.01); *G05B 2219/24184* (2013.01); *G05B 2219/25163* (2013.01); *G05B 2219/37325* (2013.01); *G05B 2219/42318* (2013.01); *H04Q 2209/86* (2013.01)

(58) Field of Classification Search
CPC ..................... G01D 18/00; G01D 3/08; G05B 2219/24184; G05B 2219/25163; G05B 2219/37325; G05B 2219/42318; G05B 2219/285423; G05B 23/0218; H04Q 9/00; H04Q 2209/86
See application file for complete search history.

(56) References Cited

U.S. PATENT DOCUMENTS

| | | | | |
|---|---|---|---|---|
| 3,927,269 | A * | 12/1975 | Yoshino | H04J 3/1605 348/530 |
| 5,606,707 | A * | 2/1997 | Tomassi | G06T 1/20 358/448 |
| 8,005,642 | B2 * | 8/2011 | Hammerschmidt | G01D 5/2448 702/94 |
| 8,058,866 | B2 * | 11/2011 | Granig | G01D 5/145 324/207.21 |
| 8,498,829 | B2 * | 7/2013 | LeMense | B60C 23/0488 702/50 |
| 8,789,424 | B2 | 7/2014 | Mayr et al. | |
| 9,096,256 | B2 | 8/2015 | Jang et al. | |
| 10,942,046 | B2 * | 3/2021 | Granig | G01D 3/08 |

(Continued)

FOREIGN PATENT DOCUMENTS

| CN | 102419403 A | 4/2012 |
|---|---|---|
| CN | 103587575 A | 2/2014 |

(Continued)

*Primary Examiner* — Manuel A Rivera Vargas
*Assistant Examiner* — Yaritza H Perez Bermudez
(74) *Attorney, Agent, or Firm* — Harrity & Harrity, LLP

(57) ABSTRACT

A sensor device using verification includes a sensor component and a verification component. The sensor component is configured to generate first data and second data. The verification component is configured to analyze the first data and the second data and generate verification data based on the first data and the second data.

16 Claims, 9 Drawing Sheets

(56) References Cited

U.S. PATENT DOCUMENTS

| | | | | |
|---|---|---|---|---|
| 2004/0202256 | A1* | 10/2004 | Giannakis | H04L 1/0071 375/267 |
| 2009/0110033 | A1* | 4/2009 | Shattil | H04B 1/7174 375/147 |
| 2009/0128160 | A1* | 5/2009 | Chiaburu | G01D 3/08 702/58 |
| 2009/0146806 | A1* | 6/2009 | Jensen | G09F 3/0294 340/540 |
| 2010/0097088 | A1* | 4/2010 | Uemura | G01D 5/24461 324/750.3 |
| 2010/0278214 | A1* | 11/2010 | Westcott | H04B 1/7163 375/E1.001 |
| 2012/0074972 | A1* | 3/2012 | Rasbornig | B60T 8/885 324/750.3 |
| 2012/0076040 | A1* | 3/2012 | Hoshino | H04W 72/04 370/252 |
| 2013/0080843 | A1 | 3/2013 | Stergiou et al. | |
| 2013/0200909 | A1* | 8/2013 | Rasbornig | B60W 50/0205 324/750.3 |
| 2016/0084684 | A1* | 3/2016 | Granig | G01D 18/00 702/182 |
| 2016/0231371 | A1* | 8/2016 | Rasbornig | G01R 31/007 |

FOREIGN PATENT DOCUMENTS

| | | |
|---|---|---|
| EP | 0180085 A2 | 5/1986 |
| WO | 2010069707 A1 | 6/2010 |
| WO | 2014091952 A1 | 6/2014 |

* cited by examiner

SENSOR SYSTEM USING SAFETY MECHANISM

CROSS-REFERENCE TO RELATED APPLICATIONS

This application is a continuation of U.S. patent application Ser. No. 14/494,055 filed Sep. 23, 2014, which is incorporated by reference as if fully set forth.

BACKGROUND

Sensors are utilized in sensing systems to detect properties, such as light, temperature, motion, and the like. The sensors are typically configured to measure a property and then provide the measurement in a suitable form. For example, a sensor may measure a magnetic field and then provide the measurement as an output signal. The measurements are then used to calculate characteristics or results by a controller, such as an electronic control unit.

Erroneous measurements and calculated characteristics can occur and be problematic for safety considerations. Such errors or faults can result from a variety of factors, such as silicon defects, radioactivity, power fluctuations, temperature changes, environmental changes, and the like. If the faults can be detected and accounted for, negative consequences can be mitigated.

One approach to detect faults is to perform a self-test of calculations used. This may identify faults in hardware used for calculations. However, errors in measurements and the like are not accounted for.

SUMMARY

Embodiments provide a system that includes a sensor device and a verification circuit implemented in a control unit external to the sensor device. The sensor device includes a first sensor element configured to sense a first property and generate first data representing a first raw signal, a second sensor element configured to sense a second property and generate second data representing a second raw signal, and a digital signal processor configured to generate calculation data based on the first data and the second data, the sensor device further comprising a first path coupled to the digital signal processor, a second path coupled to the first sensor element, and a third path coupled to the second sensor element. The verification circuit is configured to receive the first data, the second data, and the calculation data, and wherein the verification circuit is configured to generate verification data including a recalculation of the calculation data based on the received first data and the received second data.

Embodiments further provide a method of verifying sensor data. The method includes sensing by a first sensor element of a sensor device a first property to generate first data, the first data representing a first raw signal; sensing by a second sensor element of a sensor device a second property to generate second data, the second data representing a second raw signal; generating by the sensor device calculation data based on the first data and the second data; receiving by a verification circuit implemented in a control unit external to the sensor device the first data, second data, and the calculation data; generating verification data based on the received first data, the received second data, and the received calculation data, wherein generating the verification data includes a recalculation of the calculation data based on the received first data and the received second data; and identifying a fault based on the verification data.

DETAILED DESCRIPTION

Figure 1:
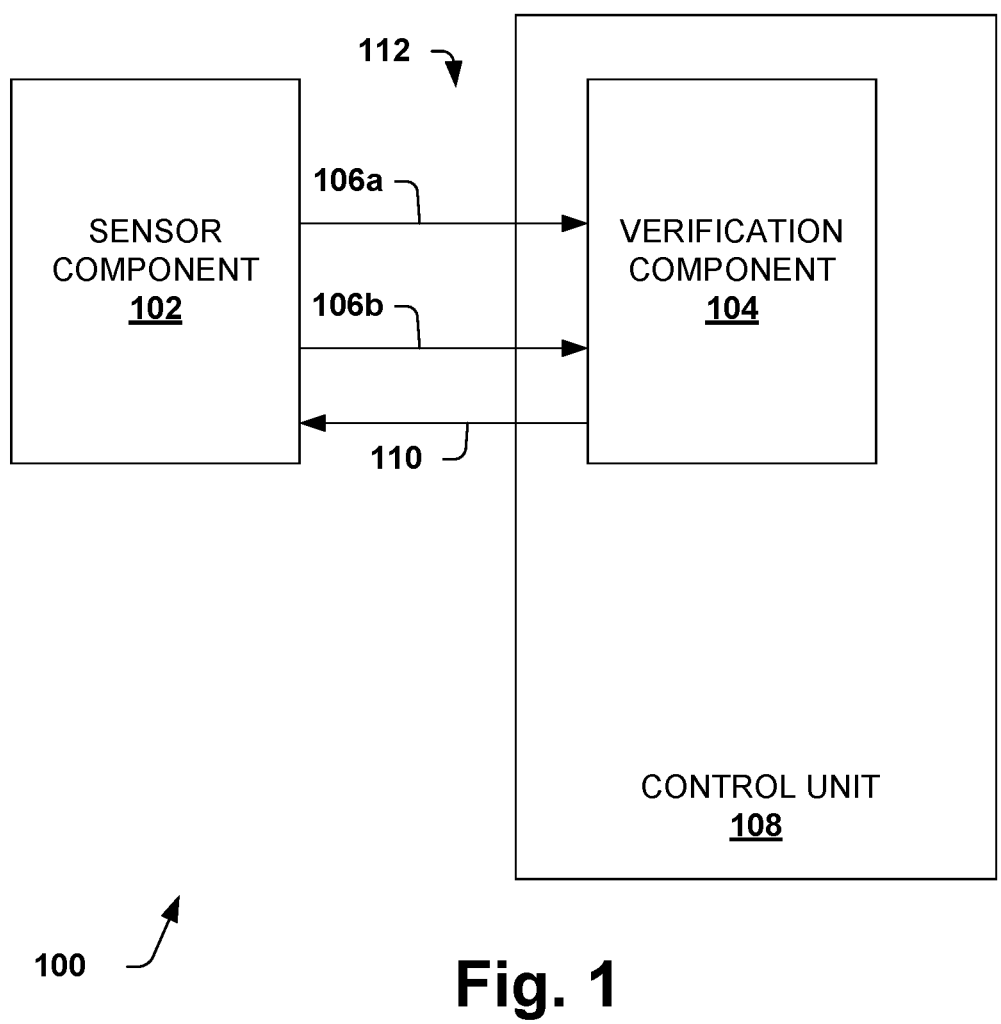
FIG. 1 is a diagram of a sensor system for verification that includes fault identification.

The present invention will now be described with reference to the attached drawing figures, wherein like reference numerals are used to refer to like elements throughout, and wherein the illustrated structures and devices are not necessarily drawn to scale.

Devices and methods are disclosed that enhance safety and facilitate error/fault identification, including common cause faults. These include generating redundant data for verification and/or calibration purposes.

FIG. 1 is a diagram of a sensor system 100 for verification that includes fault identification. The system 100 is provided in a simplified form in order to facilitate understanding. The system 100 can be utilized in automotive systems, vehicle systems, and the like. The system 100 can be fabricated into one or more devices.

The system 100 performs verification of data, fault identification and facilitates fault reaction. Various mechanisms, such as comparators, verification components, control units, and the like are used to perform verification and fault identification. By verifying data, identifying faults, and the like, safety is enhanced. Faults are identified using one or more techniques, such as those described below. The faults are identified within selected or suitable fault reaction times. In one example, a fault reaction threshold is 20 milliseconds and faults are identified within less than 10% of the fault reaction time.

The system 100 includes a sensor component 102, a verification component 104 and a control unit 108. The sensor component 102 provides a first data 106*a* and a second data 106*b*, collectively referred to as data 106. The verification component 104 analyzes and identifies faults in the first data 106*a* and the second data 106*b*. The verification component 104 can send error handling commands or calibration data 110 to the sensor component 102 in order to mitigate the occurrence of faults.

The data 106 includes one or more of a variety of types of data including, but not limited to, raw data, calculations data, calibration data and the like. The data 106 is in a suitable form including, but not limited to, digital, pulse width modulation, and analog forms. The raw data includes sensor measurement data. The calculations data includes calculations based at least partly on the measurement data.

The data 106 is transmitted from the component 102 to the verification component by an interface 112. The interface 112 includes, for example, a Hall switch mode interface, pulse width modulation, serial parallel (SPI), incremental interface, one wire programming interface, an analog interface, and the like. Additionally, the data 106 can be transmitted using frames, such as using a reserved portion of each frame as a reserve portion for the second data 106b or separate frames dedicated to the second data 106b.

The sensor component 102 includes at least two sensor elements that obtain measurement data. The sensor elements can include Hall elements, magnetic elements, pressure elements, temperature elements, angle sensors, 360 degree angle sensors, and the like. Consequently, the measurement data can include, for example, magnetic data, pressure data, temperature data, and the like.

In addition to obtaining measurement data, the sensor component 102 can also generate calculation data based on the measurement data. For example, the measurement data can be used to determine angles, speed, rotation, and the like as the calculation data.

As stated above, the verification component 104 identifies faults from the data 106 and performs the identification within a selected fault reaction time. Some examples of faults include sensor faults, such as magnetic loss detection, weak magnetic detection, under/over voltage detection, plausibility check detection, sensor faults, calculation faults, mismatch between different sensor channels, and the like. One or more verification techniques are used to identify the faults based on the first data 106a and the second data 106b. For example, measurement data from a first sensor element and a second sensor element can be bitwise compared. Independent calculation data, such as angles, can be compared.

Additionally, the verification component 104 is configured to mitigate future faults by providing error handling commands or calibration data 110 to the sensor component. The calibration data/commands 110 can be used to modify sensor elements and/or calculations. Error handling commands can be used to control the effect of errors, improve error diagnosis and change the mode of operation. An error handling command could be a full or partial reset of the sensor or a different setting for multiplexable measurement components like Amplifiers or ADCs.

The verification component 104 can generate verification data based on the first data and the second data. The verification data can include identified faults, sensor data, calculation data, and the like. The verification data can be provided to the control unit 108 and/or other external components.

The control unit 108 is coupled to the sensor component 102 and the verification component 104. Typically, the control unit 108 includes the verification component 104 and other components, such as a processor, memory, communication interface, and the like. The control unit 108 is configured to control the one or more verification techniques and facilitate fault identification. In one example, the control unit is an electronic control unit (ECU).

Figure 2:
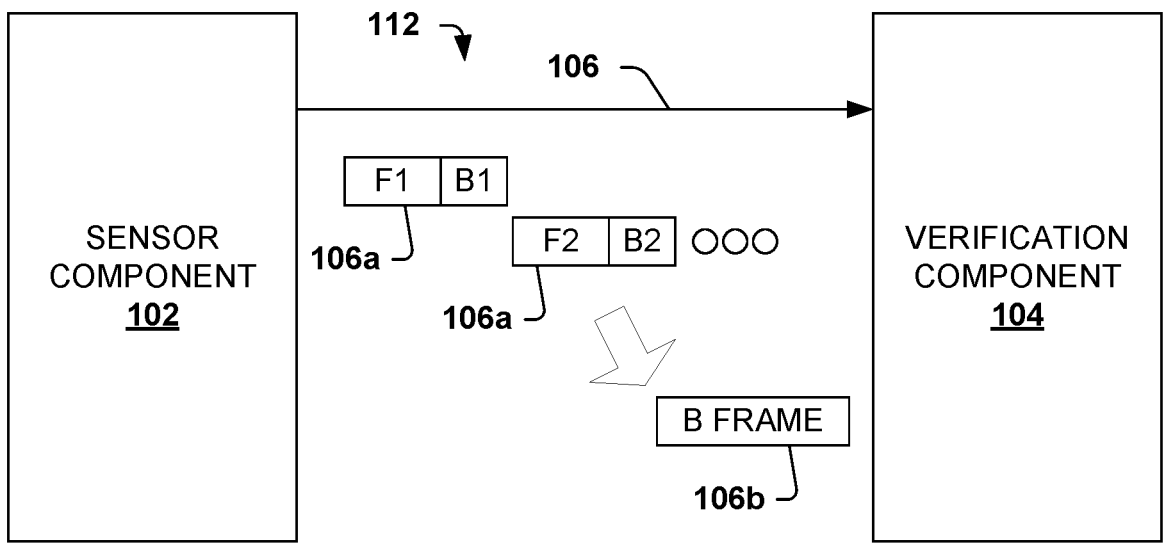
FIG. 2 is a diagram of a sensor system that utilizes portions of frames for conveying background data.

FIG. 2 is a diagram of a sensor system 200 that utilizes portions of frames for conveying background data. The system 200 can be utilized in automotive systems and the like. Additionally, the system 200 can be fabricated into one or more devices, one or more die, and the like. Similarly, named and numbered components are further described above and elsewhere. Further, the system 200 can be incorporated in part or whole into the system 100 described above.

The system 200 includes a sensor component 102 and a verification component 104. The sensor component 102 provides data 106 to the verification component 104. The verification component 104 analyzes and identifies faults in the data. The verification component 104 can, optionally, generate and send error handling commands or calibration data to the sensor component 102 in order to mitigate the occurrence of faults.

The data 106 includes one or more of a variety of types of data including, but not limited to, raw data, calculations data, calibration data and the like. The data 106, in this example, is provided as standard data 106a and background, or redundant data 106b. The standard data is also referred to as primary or normal data. The background data can be from separate sensor elements, duplicate hardware calculation components, and the like. The background data can be provided continuously, periodically, or on request.

The data 106 is provided via a first or standard path and a second or background path of the sensor component 102. The first path and the second path are independent of each other, in one example.

In this example, the data 106 is provided in digital format using frames of a selected length. The background data is interleaved with the standard data. A standard or first portion of each frame is allocated to the standard data. The standard portion typically constitutes a frame of the standard data. A background portion of a frame can be allocated to the background data. In one example, the background portion is specified as the last 4 bits of the frame. In another example, the background portion is variable in length.

The verification component 104 receives the data 106 and builds background frames that correspond to the standard frames. One or more background portions of multiple frames are collected to form each background frame. It is appreciated that each standard frame does not necessarily have a corresponding background frame.

The verification component 104 analyzes related standard frames and background frames to identify faults within a selected fault reaction time to generate verification data. Additionally, the verification component 104 can provide error handling commands or calibration data to the sensor component 102 to mitigate occurrence of faults, including data faults and calculation faults. In one example, the calibration data is provided only once for a set of data, which generally includes a number of standard frames.

The verification data includes errors, faults, sensor raw data, processed sensor data, calculation data, intermediate results, and the like. The verification data can also include calibration data and the like. The verification data can be used to identify errors/faults in algorithms, hardware, interfaces and the like. The verification data is typically used by the verification component 104, and/or provided to an external component.

Additionally, it is also appreciated that the system 200 can be considered as a sensor path that provides verification data. Another similar or identical system can operate in parallel to provide redundant verification data. As a result, the verification data and the redundant verification data can be analyzed to provide further diagnosis. In one example, the verification data and the redundant verification data are provided to an electronic control unit.

Figure 3:
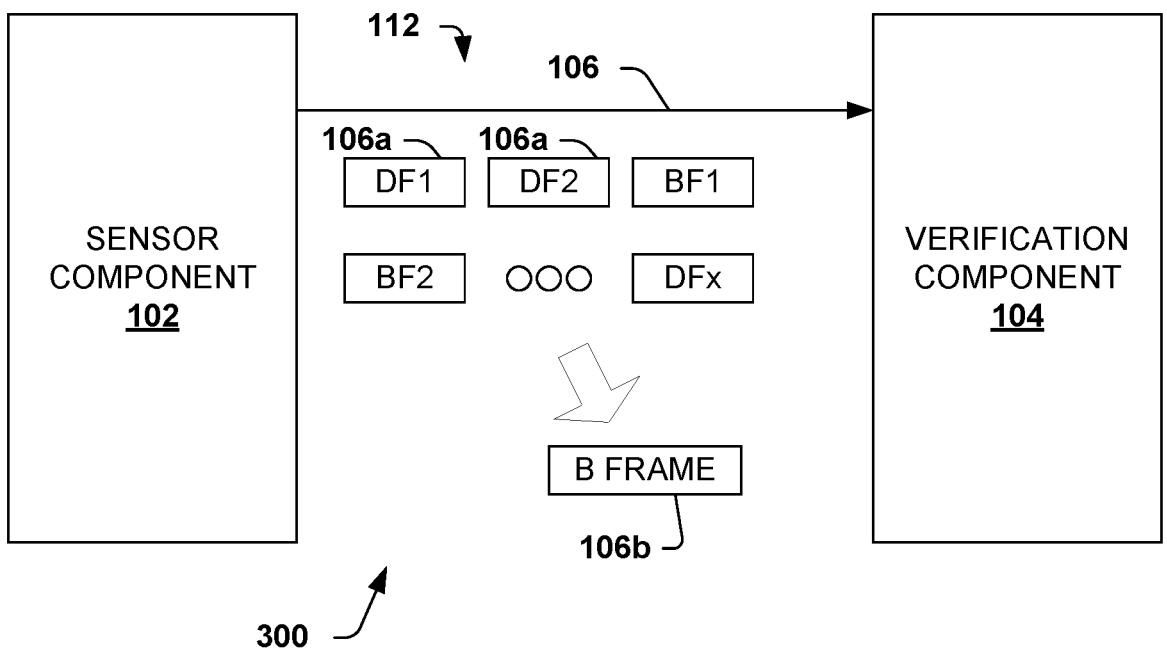
FIG. 3 is a diagram of a sensor system that utilizes separate frames for conveying background data.

FIG. 3 is a diagram of a sensor system 300 that utilizes separate frames for conveying background data. The system 300 can be utilized in automotive systems and the like.

Additionally, the system 300 can be fabricated into one or more devices, one or more die, and the like. Similarly, named and numbered components are further described above and elsewhere. Further, the system 300 can be incorporated in part or whole into the system 100 described above.

The system 300 includes a sensor component 102 and a verification component 104. The sensor component 102 provides data 106 to the verification component 104. The verification component 104 analyzes and identifies faults in the data and generates verification data.

In this example, data 106 is transferred using frames. However, instead of interleaving background data within standard frames, separate frames are used for background data. Thus, there are standard data frames or subframes shown in FIG. 3 as DF1, DF2, . . . DFx and background frames BF1, BF2, . . . BFx. One or more of the data subframes comprise a single standard data frame. Similarly, background data is provided in separate frames or subframes and are collected or consolidated into background frames having the background data 106b. The background data can be from separate sensor elements, duplicate hardware calculation components, and the like. The background data is provided, for example, continuously, periodically and/or on request.

The verification component 104 receives the data 106 in the form of subframes and builds background frames that correspond to the standard frames. It is appreciated that each standard frame does not necessarily have a corresponding background frame.

The verification component 104 analyzes related standard frames and background frames to identify faults within a selected fault reaction time to generate verification data. Additionally, the verification component 104 can provide error handling commands or calibration data to the sensor component 102 to mitigate occurrence of faults, including data faults and calculation faults. In one example, the calibration data is provided only once for a set of data, which generally includes a number of standard frames.

The verification data includes errors, faults, sensor raw data, processed sensor data, calculation data, and the like. The verification data can also include calibration data and the like. The verification data can be used to identify errors/faults in algorithms, hardware, interfaces and the like. The verification data can be provided back to the sensor component 102, used by the verification component 104, and/or provided to an external component.

Additionally, it is also appreciated that the system 300 can be considered as a sensor path that provides verification data. Another similar or identical system can operate in parallel to provide redundant verification data. As a result, the verification data and the redundant verification data can be analyzed to provide further diagnosis. In one example, the verification data and the redundant verification data are provided to an electronic control unit.

Figure 4:
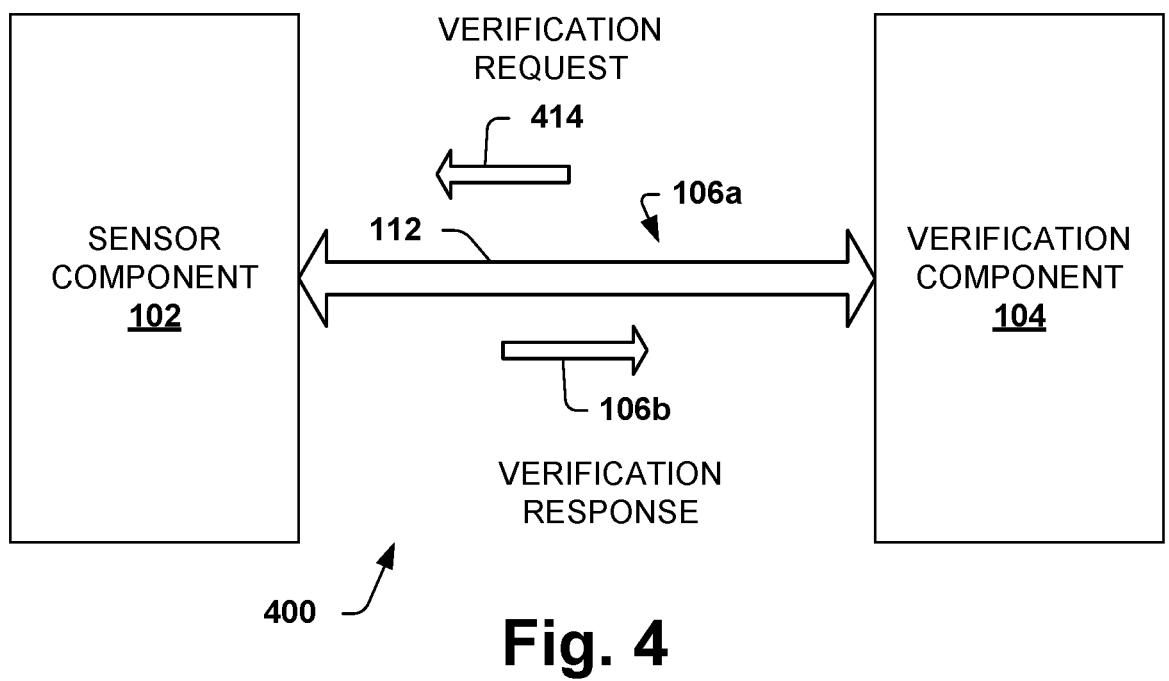
FIG. 4 is a diagram of a sensor system that utilizes burst communication for conveying background data.

FIG. 4 is a diagram of a sensor system 400 that utilizes burst communication for conveying background data. The system 400 can be utilized in automotive systems and the like. Additionally, the system 400 can be fabricated into one or more devices, one or more die, and the like. Similarly, named and numbered components are further described above and elsewhere. Further, the system 400 can be incorporated in part or whole into the system 100 described above.

The system 400 includes a sensor component 102 and a verification component 104. The sensor component 102 provides data 106 to the verification component 104. The verification component 104 analyzes and identifies faults in the data and generates verification data.

The data 106 includes standard data 106a and background data 106b. The data 106 can be provided in the form of frames. Instead of interleaving or using separate frames, the background data 106 is provided as a bust of data or frames. The burst is typically provided in response to a request, referred to as a verification request. The burst can be regarded as standard data as there is no other data being transmitted at the same time. The verification request is received by the sensor component and indicates what data is requested to be verified. This data includes, for example, sensor raw data, processed sensor data, calculation data, intermediate results and the like. In response, the sensor component 102 provides a verification response that includes the requested data 106b.

The verification component 104 receives the standard data 106a, including the data to be verified, and the verification data 106b on demand. The verification component 104 analyzes the received verification data burst and related standard frames to identify faults within a selected fault reaction time to generate verification data. Additionally, the verification component 104 can provide error handling commands or calibration data to the sensor component 102 to mitigate occurrence of faults, including data faults and calculation faults.

The verification data includes errors, faults, sensor data, calculation data, and the like. The verification data can also include calibration data and the like. The verification data can be used to identify errors/faults in algorithms, hardware, interfaces and the like. The verification data can be provided back to the sensor component 102, used by the verification component 104, and/or provided to an external component.

Additionally the system can receive a part of the verification data by background frames as described in FIG. 2 or FIG. 3 and request additional verification data on demand as shown in FIG. 4 fit it is required e.g. for a detailed analysis of a detected deviation.

Additionally, it is also appreciated that the system 400 can be considered as a sensor path that provides verification data. Another similar or identical system can operate in parallel to provide redundant verification data. As a result, the verification data and the redundant verification data can be analyzed to provide further diagnosis. In one example, the verification data and the redundant verification data are provided to an electronic control unit.

Figure 5:
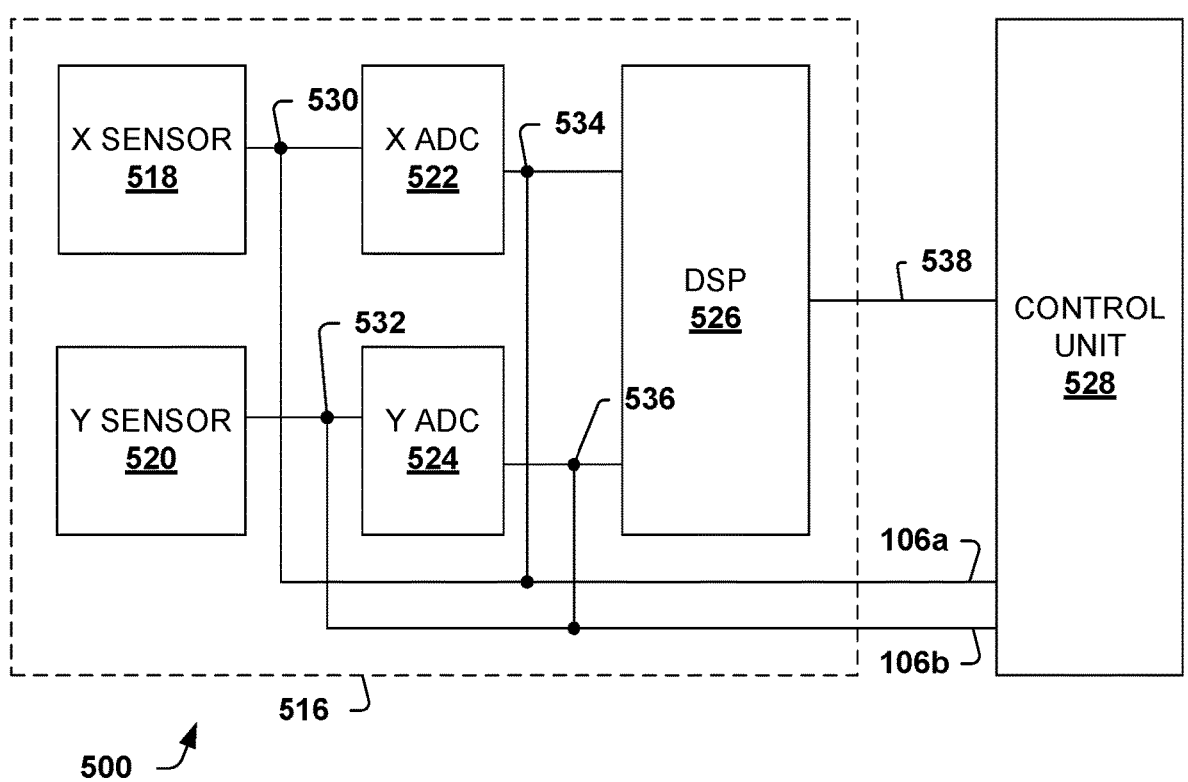
FIG. 5 is a diagram of a sensor system having redundant paths.

FIG. 5 is a diagram of a sensor system 500 having redundant paths. The system 500 is provided in a simplified format and can be utilized in sensing systems, such as automotive systems and the like. The system 500 can be fabricated into one or more devices.

The system 500 includes an angle sensor component 516 and a control unit 528. The angle sensor component 516 provides first data 106a and second data 106b to the control unit 528. The second data 106b includes redundant data based on the first data 106a. The control unit 528 analyzes the data 106 (106a and 106b) and can identify faults and generate verification data based on the analysis.

The sensor component 516 includes an x sensor, or first sensor, 518, a y sensor, or second sensor, 520, an x analog to digital converter (ADC) 522, a y ADC 524 and a digital signal processor 526. The x sensor 518 generates a first analog sensor signal based on a property measurable by the x sensor 518. The x sensor 518 can be configured to measure a magnetic field, voltage, and the like. First analog node 530 and the x ADC 522 receive the first analog sensor signal. The x ADC 522 converts the analog signal into a first digital sensor signal, which is provided to a first digital node 534 and the digital signal processor 526.

The y sensor 520 generates a second analog sensor signal based on the property measurable by the y sensor 518. Again, the y sensor 520 can be configured to measure a magnetic field, voltage, and the like. Second analog node 532 and the y ADC 524 receive the second analog sensor signal. The y ADC 524 converts the second analog sensor signal into a second digital sensor signal, which is then provided to a second digital node 536 and the digital signal processor 526.

The digital signal processor 526 receives the first digital sensor signal and the second digital sensor signal and generates calculation data therefrom. The calculation data includes, for example, angle calculations based on the first digital sensor signal and the second digital sensor signal. The calculation data and/or other data can be provided to the control unit 528 from the digital signal processor 526.

In this example, the first data 106a is associated with the x sensor 518 and the second data 106b is associated with the y sensor 520. The first data 106a can be one or more of the first analog sensor signal and the first digital sensor signal and is provided along a first path. The second data 106b can be one or more of the second analog sensor signal and the second digital sensor signal and is provided along a second path, independent of the first path. The data 106 (106a and 106b) can be in the form of analog or raw data or digital. Additionally, the data can be in the form of pulse width modulation.

As stated above, the control unit 528 analyzes the data 106 to identify faults, generate verification data and the like. An interface 538 couples the sensor component 516, including the digital signal processor 526, and the control unit 528. The interface 538 can be configured as a serial interface, a serial to parallel interface (SPI), and the like. The control unit 528 can include additional components, such as an analog to digital converter, a phase locked loop, and the like.

The first data 106a and the second data 106b are provided via separate and redundant paths. As a result, interference, noise, and the like particular to each path can be more easily identified than other approaches that utilize a single path for conveying data from multiple sensors.

Figure 6:
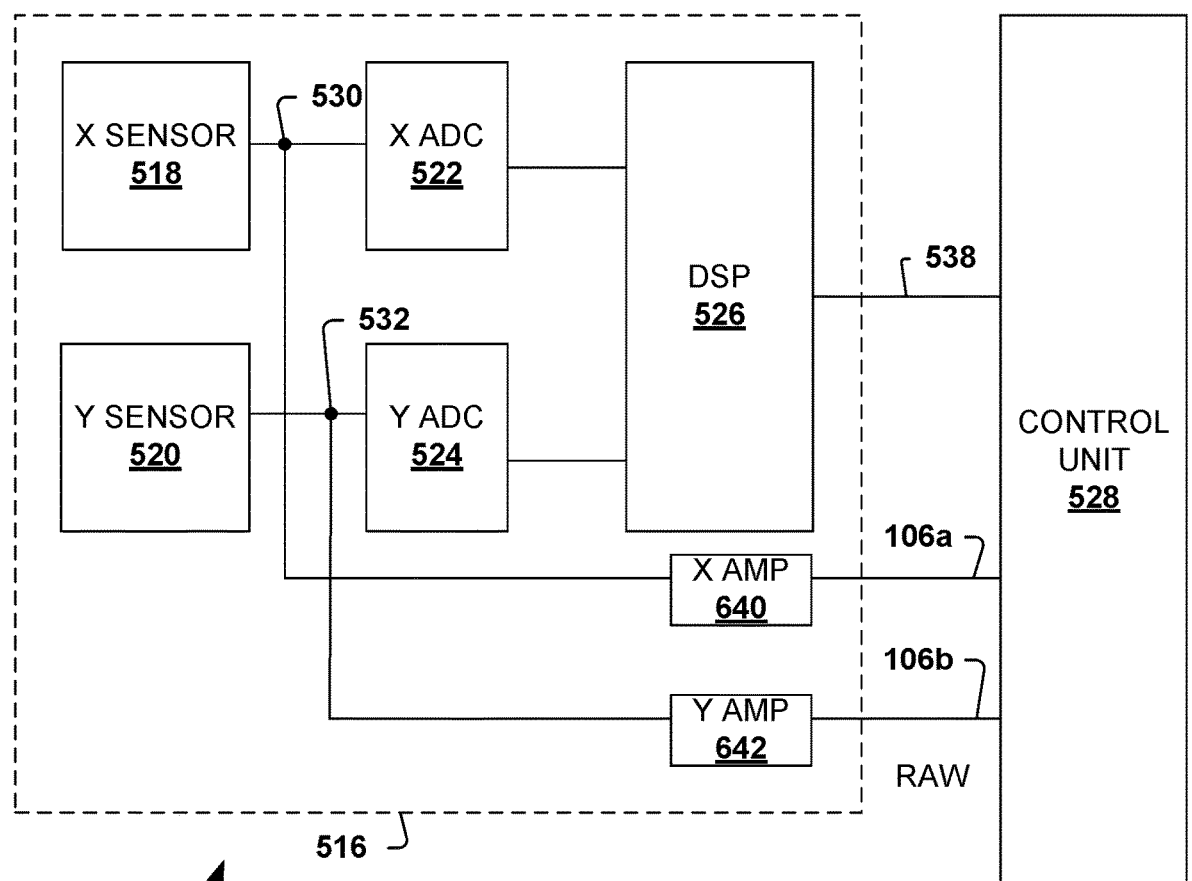
FIG. 6 is a diagram illustrating a sensor system providing sensor data in raw analog format.

FIG. 6 is a diagram illustrating a sensor system 600 providing sensor data in raw analog format. The system 600 is similar to the system 500 and description of similarly identified components is omitted. The above description can be referenced for additional details.

The system 600 includes an angle sensor component 516 and a control unit 528. The angle sensor component 516 provides data 106, in the form of first data 106a and second data 106b, to the control unit 528. The data 106 is provided in analog, raw format in this example. The second data 106b includes redundant data associated with the first data 106a. The control unit 528 analyzes the data 106 (106a and 106b) and can identify faults and generate verification data based on the analysis.

The sensor component 516 includes an x sensor, or first sensor, 518, a y sensor, or second sensor, 520, an x analog to digital converter (ADC) 522, a y ADC 524, a digital signal processor 526, an x amplifier 640 and a y amplifier 642. The x sensor 518 generates a first analog sensor signal based on a property measurable by the x sensor 518. First analog node 530 and the x ADC 522 receive the first analog sensor signal. Additionally, the x amplifier 640 also receives the first analog sensor signal and amplifies the signal to generate the first data 106a. The x ADC 522 converts the analog signal into a first digital sensor signal, which is provided to the digital signal processor 526.

The x amplifier 640 amplifies the signal with a selected gain so that the first data signal 106a has a suitable power. As a result, the first data signal 106a is received by the control unit 528. Without amplification, the output of the x sensor 518, the first analog signal, may be too low to be properly provided to the control unit.

The y sensor 520 generates a second analog sensor signal based on the property measurable by the y sensor 518. Again, the y sensor 520 can be configured to measure a magnetic field, voltage, and the like. Second analog node 532 and the y ADC 524 receive the second analog sensor signal. Further, the y amplifier 642 also receives the second analog sensor signal and amplifiers the signal to generate the second data 106b. The y ADC 524 converts the second analog sensor signal into a second digital sensor signal, which is then provided to a second digital node 536 and the digital signal processor 526.

The y amplifier 642 amplifies the signal with a selected gain so that the second data signal 106b has a suitable power. As a result, the first data signal 106b is received by the control unit 528. Without amplification, the output of the y sensor 520, the second analog signal, may be too low to be properly provided to the control unit.

The digital signal processor 526 receives the first digital sensor signal and the second digital sensor signal and generates calculation data therefrom. The calculation data includes, for example, angle calculations based on the first digital sensor signal and the second digital sensor signal. The calculation data and/or other data can be provided to the control unit 528 from the digital signal processor 526.

As stated above, the control unit 528 analyzes the data 106 to identify faults, generate verification data and the like. An interface 538 couples the sensor component 516, including the digital signal processor 526, and the control unit 528. The control unit 528, in this example, includes an analog to digital converter for converting the raw data 106 into digital format.

Figure 7:
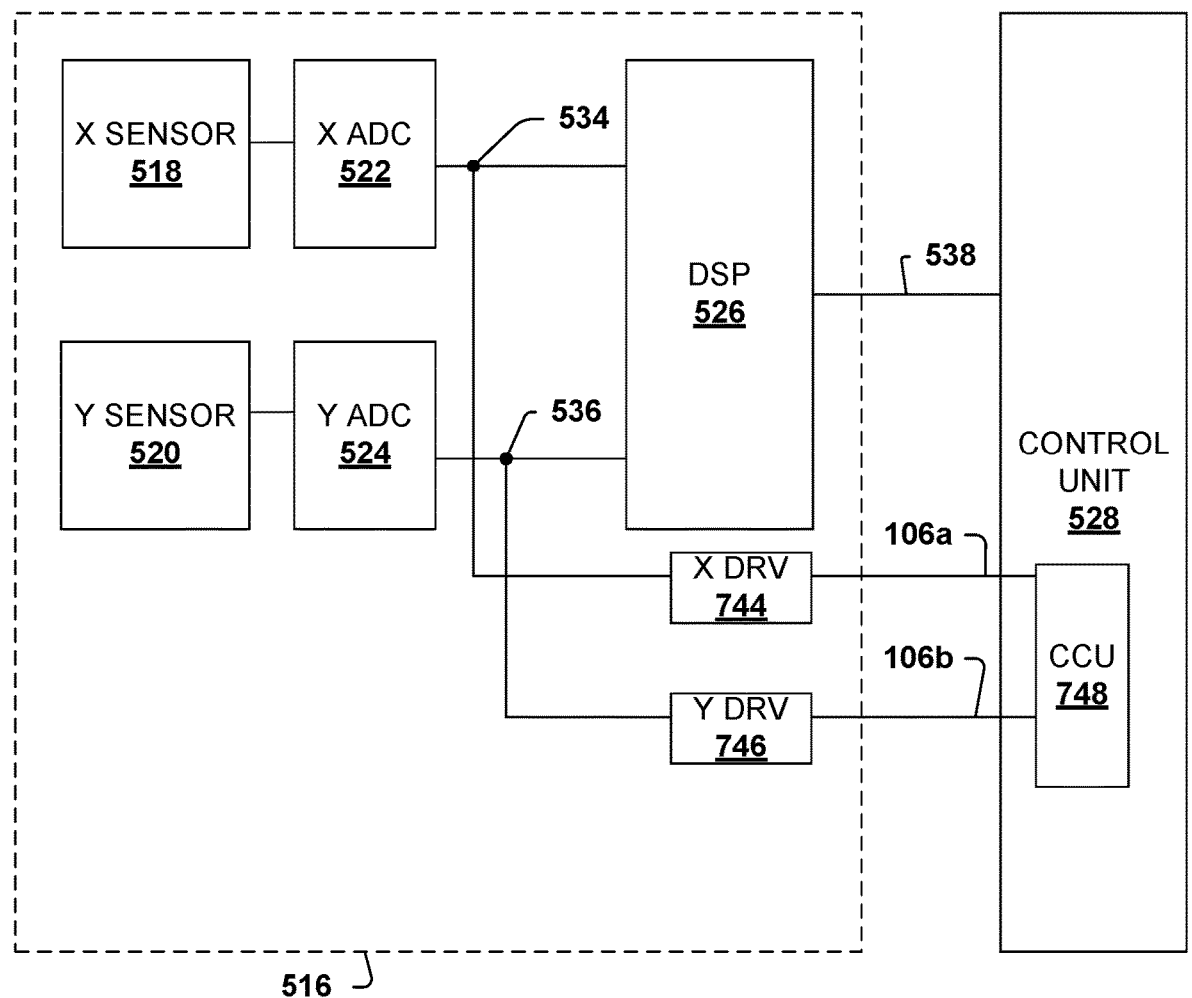
FIG. 7 is a diagram of a sensor system having redundant paths and providing data in digital form.

FIG. 7 is a diagram of a sensor system 700 having redundant paths and providing data in digital form. The system 700 is provided in a simplified format and can be utilized in sensing systems, such as automotive systems and the like. The system 700 can be fabricated into one or more devices.

The system 500 includes an angle sensor component 516 and a control unit 528. The angle sensor component 516 provides first data 106a and second data 106b in a digital format to the control unit 528. The second data 106b includes redundant data based on the first data 106a. The control unit 528 analyzes the data 106 (106a and 106b) and can identify faults and generate verification data based on the analysis. The control unit 528 can omit an analog to digital converter because the data 106 is provided in digital format.

The sensor component 516 includes an x sensor, or first sensor, 518, a y sensor, or second sensor, 520, an x analog to digital converter (ADC) 522, a y ADC 524, a digital signal processor 526, an x digital driver 744 and a y digital driver 746. The x sensor 518 generates a first analog sensor signal based on a property measurable by the x sensor 518. The x ADC 522 receives the first analog sensor signal. The x ADC 522 converts the analog signal into a first digital sensor signal, which is provided to a first digital node 534 and the digital signal processor 526. From there, the first digital sensor signal is received by the x driver 744.

The y sensor 520 generates a second analog sensor signal based on the property measurable by the y sensor 518. The y ADC 524 receives the second analog sensor signal and converts the second analog sensor signal into a second digital sensor signal, which is then provided to a second digital node 536 and the digital signal processor 526. The y driver 746 also receives the second digital sensor signal.

The digital signal processor 526 receives the first digital sensor signal and the second digital sensor signal and generates calculation data therefrom. The calculation data includes, for example, angle calculations based on the first digital sensor signal and the second digital sensor signal. The calculation data and/or other data can be provided to the control unit 528 from the digital signal processor 526.

The x driver 744 sends first digital sensor signal as the first data 106a in the form of a digital data stream. Similarly, the y driver 746 sends the second digital sensor signal as the second data 106a in the form of a digital data stream. It is appreciated that other suitable mechanisms can be employed to send the digital sensor signals.

The control unit 528 is configured to capture the data 106 using suitable techniques, such as interrupts, counter units and the like. The control unit 528, in this example, uses a capture and compare unit (CCU) 748 to compare the first data 106a and the second data 106b in order to identify faults.

Figure 8:
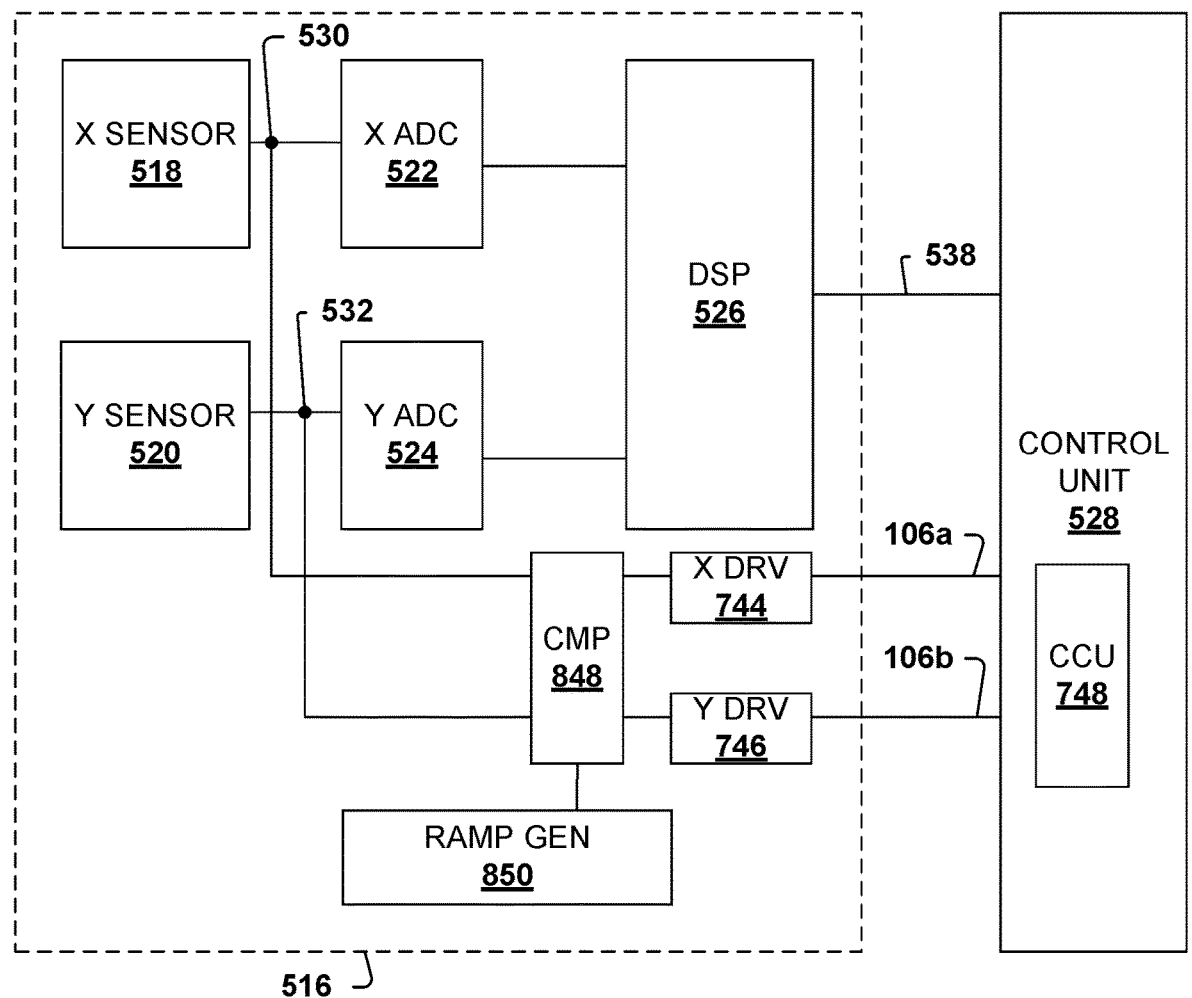
FIG. 8 is a diagram of a sensor system using a comparator in the sensor component.

FIG. 8 is a diagram of a sensor system 800 using a comparator in the sensor component. The comparator compares separate data and generates a comparison signal. The system 800 is provided in a simplified format and can be utilized in sensing systems, such as automotive systems and the like. The system 800 can be fabricated into one or more devices.

The system 800 includes an angle sensor component 516 and a control unit 528. The angle sensor component 516 provides comparison signals using pulse width modulation as first data 106a and second data 106b. The control unit 528 demodulates and analyzes the data 106 (106a and 106b) to identify faults and generate verification data based on the analysis.

The sensor component 516 includes an x sensor 518, a y sensor 520, an x analog to digital converter (ADC) 522, a y ADC 524, a digital signal processor 526, a comparator 848, an x driver 744 and a y driver 746. The x sensor 518 generates a first analog sensor signal and the y sensor 520 generates a second analog sensor signal. First analog node 530 and the x ADC 522 receive the first analog sensor signal. Additionally, the comparator 848 also receives the first analog sensor signal.

Second analog node 532 and the y ADC 524 receive the second analog sensor signal. The y ADC 524 converts the second analog sensor signal into a second digital sensor signal, which is then provided to a second digital node 536 and the digital signal processor 526. The comparator 848 also receives the second analog sensor signal.

The comparator 848 generates one or more comparison signals based on the first and second analog sensor signals and a ramp signal. The comparison signals can indicate variations or uniformity between the signals. The ramp signal is provided by a ramp generator 850. It is appreciated that alternate variations include generating comparison signals from the first and second digital sensor signals.

The x driver 744 generates the first data 106a from a first of the comparison signals. In one example, the first data 106a is generated using pulse width modulation. The y driver 746 generates the second data 106b from a second of the comparison signals. In one example, the second data 106b is generated using pulse width modulation.

As stated above, the control unit 528 analyzes the data 106 to identify faults, generate verification data and the like. An interface 538 couples the sensor component 516, including the digital signal processor 526, and the control unit 528. The control unit 528 includes a capture and compare unit (CCU) 748, which is configured to capture and compare the comparison signals provided by the data 106.

Figure 9:
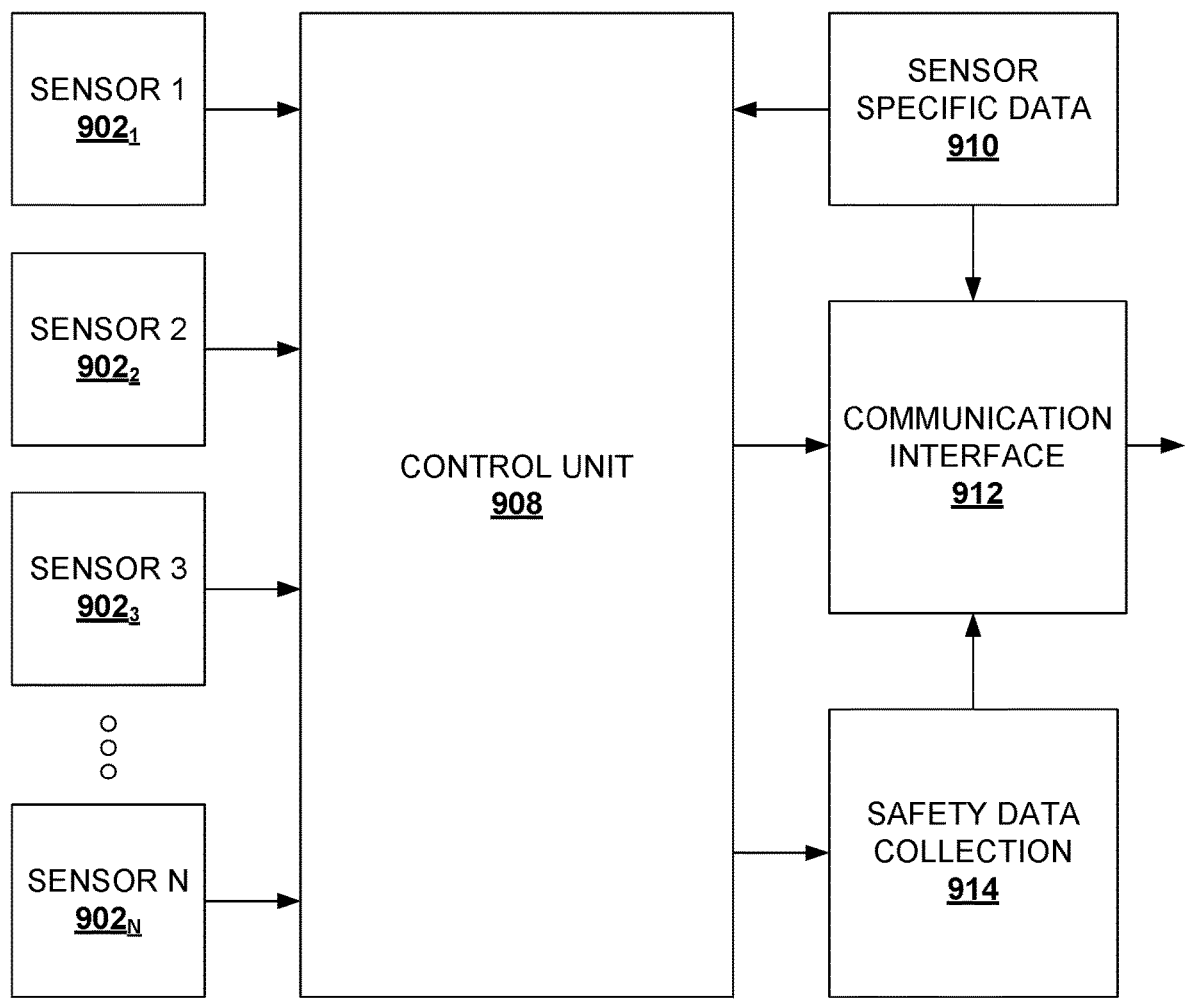
FIG. 9 is a diagram of a sensor system for verification of multiple sensors in the same operation cycle.

FIG. 9 is a diagram of a sensor system 900 for verification of multiple sensors in the same operation cycle. The system 900 is provided in a simplified form in order to facilitate understanding. The system 900 can be utilized in automotive systems, vehicle systems, and the like. Additionally, the system 900 can be fabricated into one or more devices.

The system 900 includes a plurality of sensors 902, a processing or processor unit 908, a sensor specific data storage 910, a communication interface 912, and a safety data storage 914. The plurality of sensors include multiple types of sensors and are individually shown as 9021, 9022, . . . and 902N and collectively referred to as 902. The sensors 902 include types such as Hall sensors, pressure sensors, temperature sensors, stress sensors, and the like. The sensors 902 can be part of or in addition to a sensor component, such as the component 102. The sensors 902 operate according to a clock and each obtain a measurement or sample during a clock cycle. The samples from the sensors 902 are referred to as a set of sensor samples. The set of sensor samples include verification samples or data. For example, a second temperature sensor can be used to for verification of a first temperature sensor.

The processor unit 908 includes a processing unit, synthesized hardware, a controller core with software, and the like. The processor unit 908 obtains the set of sensor samples for a current clock cycle and stores the samples in the sensor specific data storage 910. Additionally, the processor unit 908 generates or collects calculations based on the sensor samples. For example, an angle position of a motor shaft can be determined from one or more sensor samples. The calculations can be duplicated as verification data and stored in the safety data storage 914 as verification calculations.

The communication interface 912 is configured to provide the sensor samples and calculations, including duplicate sensor samples and calculations (background data) to an external component, such as an electronic control unit or verification component, such as the control unit 108 and the verification component 104, described above. The data and background data can be provided as shown above in FIG. 2, 3 and elsewhere. The electronic control unit is configured to verify the sensor samples and calculations and identify faults, if present. In one example, the electronic control unit performs bitwise comparisons of sensor samples and verification samples for a current clock cycle. In another example, the electronic control unit performs bitwise comparison of calculations and verification calculations.

Figure 10:
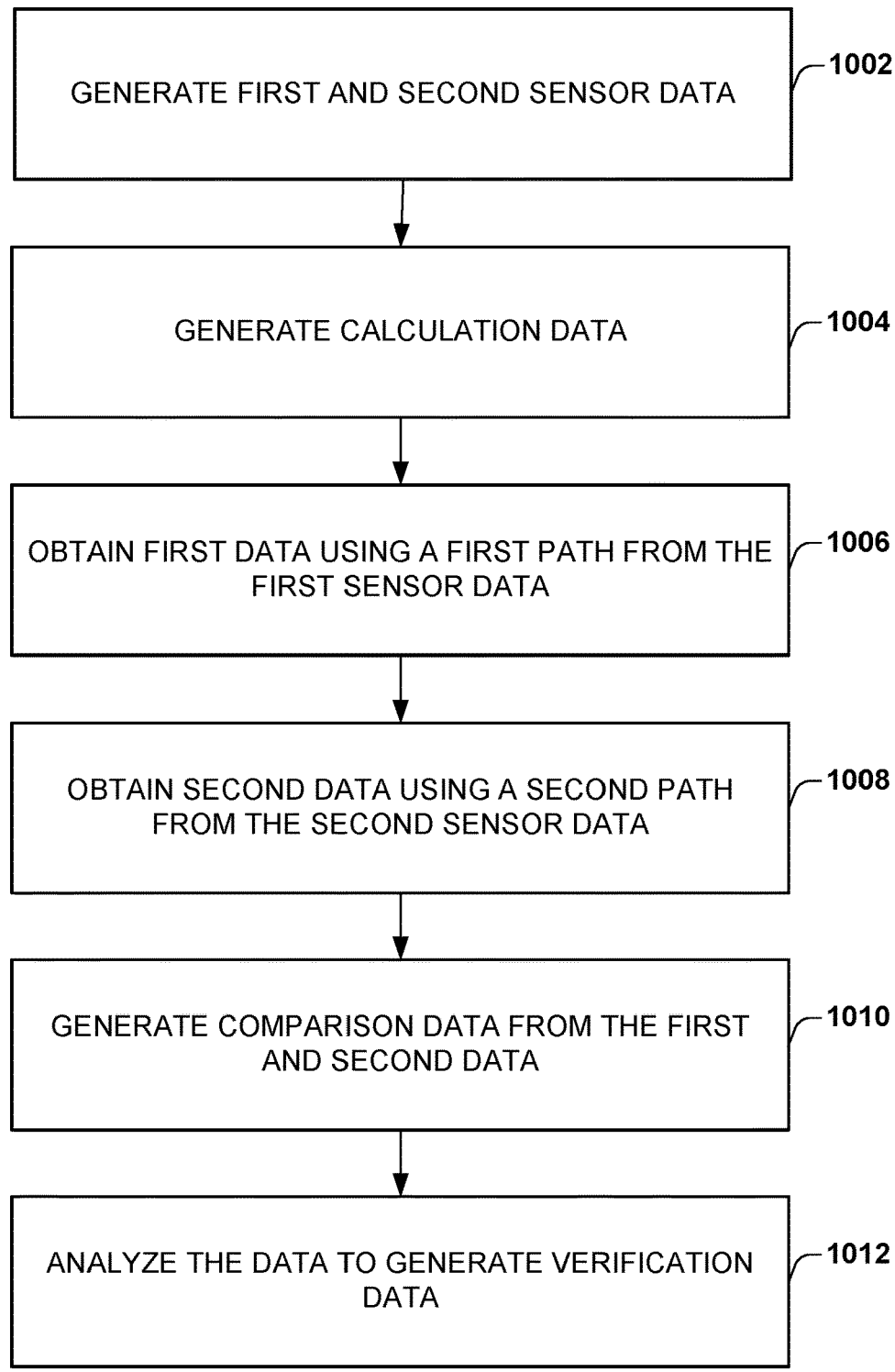
FIG. 10 is a flow diagram illustrating a method of verifying sensor.

FIG. 10 is a flow diagram illustrating a method 1000 of verifying sensor data. The method 1000 uses separate paths to convey data, which is analyzed for verification.

First sensor data and second sensor data is generated at block 1002. The first and second sensor data is typically raw data provided by sensors based on measurement or detection of a property. The sensor data can include magnetic field, flux, voltage, temperature and the like information. Generally, a first sensor or sensor element provides the first sensor data and a second sensor or sensor element provides the second sensor data.

Calculation data is generated based at least partially on the first sensor data and/or the second sensor data at block 1004. In one example, a digital signal processor, such as the DSP 526, generates the calculation data. The calculation data can include, for example, angle determinations, temperature, speed calculations, and the like. The calculation data can include first calculation data, which is related to the first sensor data and second calculation data, which is related to the second sensor data.

First data is obtained using a first path from the first sensor data and the calculation data at block 1006. The first path includes, for example, one or more of the first sensor element, an analog to digital converter, a digital signal processor, a comparator, an amplifier, a digital driver, and the like.

Second data is obtained using a second path from the second sensor data and the calculation data at block 1008. The second path includes, for example, one or more of the second sensor element, an analog to digital converter, a digital signal processor, a comparator, an amplifier, a digital driver, and the like. The second path is typically independent of the first path. In one example, the second data includes sensor data and other data. The other data includes information that can be used to convert the sensor data of the second data into the first data. As a result, in this example, the second data can include a duplicate of the first data for purposes, such as verification and the like.

Comparison data is generated from the first data and the second data at block 1010. The comparison data can be generated by a comparator, a control unit, a digital signal processor, a verification component, and the like. The comparison data can include first comparison data associated with the first sensor and second comparison data associated with the second sensor.

The comparison data and/or the first data and the second data are analyzed at block 1012 to generate verification data. One or more mechanisms can be utilized to generate the verification data, including recalculation, bitwise comparisons, and the like. In one example, the verification data is generated by a control unit, such as the control unit 528 described above. In another example, the verification data is generated by a verification component, such as the verification component 104 described above. The mechanism(s) used in the analysis can be provided by and/or controlled by a control unit, such as the control unit 108 described above.

While the methods are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

It is appreciated that the claimed subject matter may be implemented as a method, apparatus, or article of manufacture using standard programming and/or engineering techniques to produce software, firmware, hardware, or any combination thereof to control a computer to implement the disclosed subject matter (e.g., the systems/devices shown in FIGS. 1, 2, etc., are non-limiting examples of system that may be used to implement the above methods). The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

A sensor device using verification includes a sensor component and a verification component. The sensor component is configured to generate first data and second data using independent paths. The verification component is configured to analyze the first data and the second data and generate verification data based on the first data and the second data.

A sensor device includes a first sensor, a second sensor, a first path, a second path, and a control unit. The first sensor is configured to generate first analog sensor data. The second sensor is configured to generate second analog sensor data. The first path is configured to provide first comparison data based on the first analog sensor data. The second path is configured to provide second comparison data based on the second analog sensor data. The control unit is configured to receive the first comparison data and the second comparison data and to generate verification data based on the first comparison data and the second comparison data.

A method of verifying sensor data is disclosed. First data is obtained using a first path. Second data is obtained using a second path. The second path is independent of the first path. Comparison data is generated from the first data and the second data. The comparison data is analyzed by a control unit to generate verification data.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A system, comprising:
   a sensor device comprising a first sensor element configured to sense a first property and generate first data representing a first raw signal, a second sensor element configured to sense a second property and generate second data representing a second raw signal, and a digital signal processor configured to generate calculation data based on the first data and the second data, the sensor device further comprising a first path coupled to the digital signal processor, a second path coupled to the first sensor element, and a third path coupled to the second sensor element; and
   a verification circuit implemented in a control unit external to the sensor device, the verification circuit configured to receive the first data, the second data, and the calculation data, and wherein the verification circuit is configured to generate verification data including a recalculation based on the received first data and the received second data.

2. The system of claim 1, wherein the sensor device is configured to generate the first data and the second data using independent paths.

3. The system of claim 1, wherein the sensor device is configured to interleave portions of the second data into a plurality of frames having the first data, and the verification circuit is configured to regenerate the second data from the interleaved portions of the plurality of frames.

4. The system of claim 1, wherein the sensor device generates a plurality of subframes for the second data, and the verification circuit is configured to regenerate the second data from the plurality of subframes for the second data.

5. The system of claim 1, wherein control unit is configured to receive the calculation data via a first communication path between the sensor device and the control unit and to receive the first data and second data via a second communication path between the sensor device and the control unit, the second communication path being separate from the first communication path.

6. The system of claim 1, wherein the verification circuit is configured to identify faults based on the received first data and the received second data.

7. The system of claim 1, wherein the verification circuit is configured to generate calibration data based on the received first data and the received second data and to provide the calibration data to the sensor device.

8. The system of claim 1, wherein the verification circuit is configured to generate an error handling command, wherein the error handling command includes at least one of a full reset of the sensor device, a partial reset of the sensor device, or a different setting for measurement components of the sensor device.

9. The system of claim 1, wherein the first property is a magnetic field and the second property is a temperature.

10. The system of claim 1, wherein the recalculation is a recalculation of the calculation data.

11. The system of claim 1, wherein the recalculation is a recalculation of an intermediate result of the calculation data.

12. A method of verifying sensor data, the method comprising:
sensing by a first sensor element of a sensor device, a first property to generate first data, the first data representing a first raw signal;
sensing, by a second sensor element of the sensor device, a second property to generate second data, the second data representing a second raw signal;
generating, by the sensor device calculation data based on the first data and the second data;
receiving, by a verification circuit implemented in a control unit external to the sensor device, the first data, second data, and the calculation data;
generating, by the verification circuit, verification data based on the received first data, the received second data, and the received calculation data, wherein generating the verification data includes a recalculation based on the received first data and the received second data; and
identifying, by the verification circuit, a fault based on the verification data.

13. The method of claim 12, wherein the first property is a magnetic field and the second property is a temperature.

14. The method of claim 12, wherein the recalculation is a recalculation of the calculation data.

15. The method of claim 12, wherein the recalculation is a recalculation of an intermediate result of the calculation data.

16. A system, comprising:
a sensor device comprising a first sensor element configured to sense a first property of a magnetic field and generate first data representing the first property, a second sensor element configured to sense a second property of the magnetic field and generate second data representing the second property, and a digital signal processor configured to generate calculation data based on the first data and the second data, the calculation data representing an angle calculated from the first data and second data,
wherein the sensor device further comprises a first path coupled to the digital signal processor, a second path coupled to the first sensor element, and a third path coupled to the second sensor element;
a digital interface configured to send the first data, the second data, and the calculation data to an external control unit; and
the external control unit comprising a verification circuit, the verification circuit configured to receive the first data, the second data, and the calculation data, and wherein the verification circuit is configured to generate verification data including a recalculation based on the received first data and the received second data.

* * * * *